United States Patent [19]

Masser

Best Available Copy

[11] E Re. 30,308

[45] Reissued Jun. 17, 1980

[54] SUSPENSION STRUCTURE FOR AUTOMOTIVE VEHICLES

[75] Inventor: Lloyd D. Masser, Muskegon, Mich.

[73] Assignee: Lear Siegler, Inc., Santa Monica, Calif.

[21] Appl. No.: 890,864

[22] Filed: Mar. 24, 1978

Related U.S. Patent Documents

Reissue of:

[64] Patent No.: 3,482,854
Issued: Dec. 9, 1969
Appl. No.: 715,843
Filed: Mar. 25, 1968

[51] Int. Cl.[2] ..... B60G 9/02; B60G 11/28

[52] U.S. Cl. ..... 280/713; 267/15 R

[58] Field of Search ..... 280/688, 689, 702, 713; 267/15 R, 30, 36 A, 54 A

[56] References Cited

U.S. PATENT DOCUMENTS

| | | | |
|---|---|---|---|
| 3,332,701 | 7/1967 | Masser | 280/713 |
| 3,361,445 | 1/1968 | Harbers | 280/712 |

*Primary Examiner*—Philip Goodman
*Attorney, Agent, or Firm*—John E. McGarry

[57] ABSTRACT

A vertically swingable control arm has a pivotal connection with a bracket on the vehicle frame and another connection to a bracket on the axle. One or more of these connections includes a bolt passing through aligned apertures in the bracket and control arm. The bracket apertures have a larger cross dimension than the bolt to facilitate alignment of the axle relative to the frame. The axle is initially secured in aligned relation by tightening a nut on the bolt. A plate carried by the bolt is then welded to the bracket to fix the relative alignment of the axle and frame.

23 Claims, 9 Drawing Figures

SUSPENSION STRUCTURE FOR AUTOMOTIVE VEHICLES

Matter enclosed in heavy brackets [ ] appears in the original patent but forms no part of this reissue specification; matter printed in italics indicates the additions made by reissue.

This invention relates generally to a suspension of the type which has two control arms pivoted to opposite sides of the vehicle frame so that they swing in a vertical direction. An axle which carries ground-engaging wheels is secured to the control arms, and springs are disposed in load-transmitting relation between the arms and the frame. More particularly, the invention involves the connections between the control arms and frame and, in some cases, the connections between the control arms and axle. These connections are constructed and arranged to facilitate aligning of the axle relative to the frame and to fix the axle in its proper alignment.

It is conventional in suspensions of this type to utilize a system of turnbuckles, adjusting screws, eccentric pins, or the like to adjust the alignment of the axle relative to the frame. In each case, a clamp or equivalent device is used to lock the adjusting mechanism after the adjustment has been effected. Conventionally, the locking device is manually releasable to facilitate such readjustment of the axle alignment as may be necessary from time to time during the life of the vehicle.

The conventional adjusting mechanisms have several objectionable characteristics. First of all, they add significantly to the cost of a suspension, and their weight reduces the maximum permissible payload in localities where maximum load laws are in effect. Secondly, they are susceptible to tinkering by the vehicle operator. Truck drivers, for example, are notoriously prone to attempt axle alignment corrections when they suspect that an axle is misaligned. Most such attempts worsen the misalignment rather than improving it.

The object of this invention is to provide a relatively simple, inexpensive suspension structure which eliminates entirely the conventional axle alignment adjusting mechanism but which, nevertheless, facilitates both initial and subsequent axle alignment adjustments as required and which prevents unauthorized attempts by vehicle operators to change an axle alignment adjustment.

In general, the invention is carried out by providing in one or more of the brackets by which the control arms are connected to the frame or axle an opening which has a larger diameter than a bolt which passes therethrough. This enables the control arms to be shifted relative to the frame or axle to obtain the proper axle alignment. The adjusted connection or connections are tightened by one or more nuts to initially secure the parts in their properly adjusted position. Then a plate or plates carried by each bolt is welded to the bracket through which the bolt extends to fix the parts in their properly aligned relation. Subsequent alignment adjustments can only be accomplished by first burning off the welds. Following the adjustment, the plates and brackets are rewelded. In the drawings:

Figure 1:
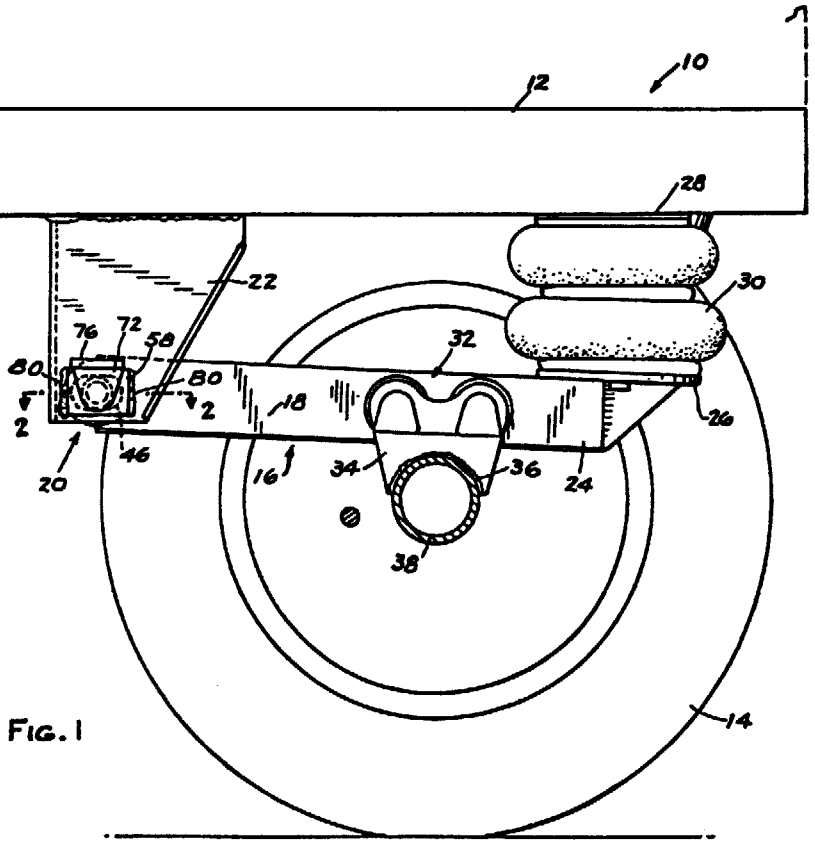
FIG. 1 is a fragmentary, generally side elevational view of a suspension incorporating the present invention.

Represented in FIG. 1 is a truck or other vehicle 10 having a frame 12 from which a pair of ground-engaging wheels 14 are suspended by a suspension 16 embodying the present invention. In general, the suspension includes at each side of the vehicle a control arm 18 pivotally connected at 20 to a bracket 22 on the frame. The control arms swing vertically about their pivotal connections which are substantially coaxial. Each control arm has a free end portion 24 with a pedestal 26 thereon. Frame 12 is provided with a pedestal 28, and an air spring 30 is disposed in load-transmitting relation between the two pedestals. Control arms 18 are connected at 32 to brackets 34 anchored as by welding 36 to an axle 38 for wheels 14.

Bracket 22 has two laterally spaced sides 40, 42 between which an end portion 44 of control arm 18 is disposed. Bracket sides 40, 42 are provided with aligned openings 46, 48 respectively, and these openings are elongate in a direction longitudinal of control arms 18.

Figure 2:
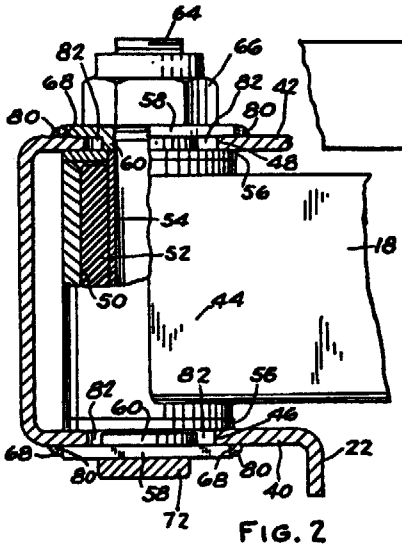
FIG. 2 is an enlarged sectional view of line 2—2 of FIG. 1 with parts broken away to illustrate structural details.

End portion 44 of the control arm has an opening 50 within which is press fitted a torsion bushing 52 of elastomeric material such as rubber. The inner surface of the bushing is bonded to a metal sleeve 54 aligned with bracket openings 46, 48. Washers 56 are disposed between the inner faces of bracket sides 40, 42 and end portion 44 of the control arm (FIG. 2). A pair of plates 58 are engaged against the outer faces of bracket sides 40, 42 (FIG. 2), and each of these plates has a central portion with an axial boss 60 and an opening 62 therethrough.

A pin in the form of a bolt 64 is passed through openings 62, washers 56, bracket openings 46, 48, and sleeve 54 to connect control arm end 44 pivotally to frame bracket 22. A nut 66 is threaded onto bolt 64. Each plate 58 has side edge portions 68 which extend in a generally vertical direction and a top edge portion 70 which extends generally horizontally. Bolt 64 has a head 72 with a flat top edge portion 74. A lug 76 projects outwardly from side 40 of bracket 22 adjacent opening 46.

In assembled relation of the parts, the undersurface of lug 76 projects adjacent flat 74 on bolt head 72 and top edge 70 of the plate 58 adjacent thereto to prevent the bolt and plate from turning when nut 66 is tightened onto the bolt. Similarly, bracket side 42 has an outwardly projecting lug 78 adjacent top edge 70 of the plate 58 next to nut 66 to prevent that plate from rotating as the nut is tightened. Lug 78 may be shorter than lug 76, since it does not have to project outwardly far enough to engage a bolt head.

When nut 66 has been securely tightened, the parts are in the relation illustrated in FIG. 2 with plates 58, end portions 44 of control arm 18, washers 56, sleeve 54, and boss 60 variously in tight metal-to-metal contact. Side edge portions 68 of plates 58 are welded at 80 to the outer faces of sides 40, 42 of frame bracket 22.

Figures 3, 4:
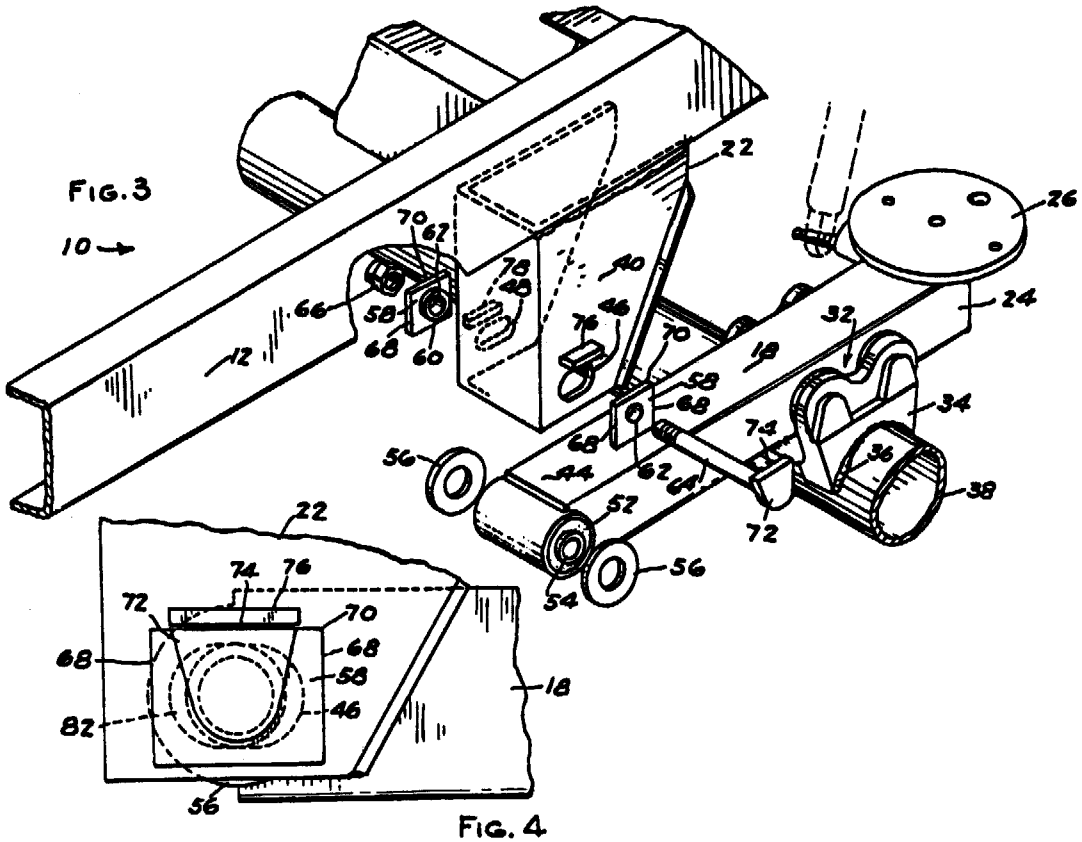
FIG. 3 is an exploded perspective view of the suspension shown in FIG. 1.
FIG. 4 is an enlarged fragmentary, generally elevational view of a connection between a control arm and frame bracket prior to a welding step.

Axle 38 is aligned relative to frame 12 as a step in providing the completed pivotal connection 20 described above between control arm 18 and bracket 22. The parts are first assembled with nut 66 loosely threaded onto bolt 64. Plates 58 at this time are not welded into position (FIG. 4) but are free to move horizontally relative to bracket 22 because of the horizontal clearance 82 between elongate openings 46, 48 and bosses 60. Thus when the parts are loosely assembled, control arm 18 can be moved bodily relative to vehicle frame 12. When the control arm is so moved, axle 38 moves with it because the two are connected together at 32.

By this means, the position of axle 38 is adjusted until the correct alignment relative to frame 12 is obtained. Then nut 66 is tightened to the FIG. 2 position to initially secure control arm 18 in a position in which axle 38 is in its proper alignment. Lugs 76, 78 prevent plates 58 and bolt head 72 from turning. Side edges 68 of the plates are thereby retained in their generally vertical orientation. After nut 66 has been tightened, side edges 68 are welded to the outer faces of bracket sides 40, 42 at 80. This fixes control arm 18 in a position in which axle 38 has proper alignment with respect to frame 12.

Subsequently, if for maintenance or other purposes, it is desired to disassemble control arm 18 from bracket 22, this may be done merely by unthreading nut 66 and removing bolt 64. Plates 58 remain anchored in position on bracket 22. When the parts are reassembled, axle 38 assumes its position of proper alignment with respect to frame 12.

During the course of use of a vehicle, it sometimes happens that an axle 38 becomes improperly aligned with respect to the frame. This is usually due to wear or distortions in the various members of a suspension in the normal course of use. In conventional suspensions wherein manual adjustments are provided for axle-aligning purposes, it is possible for the vehicle operator to tinker with the aligning mechanism in an attempt to correct the misalignment. However, axle alignment is a procedure which usually requires special knowledge and special equipment, and an average vehicle operator has neither. The tinkering referred to therefore, in most cases, results in worsening of the axle alignment rather than improving it.

With the structure of the present invention, it is virtually impossible for the vehicle operator to tinker with the axle alignment. However, at a garage or other suitably equipped maintenance facility, realignment is a relatively simple procedure. First, welds 80 are burned off and nut 66 is loosened. Then control arm 18 is horizontally shifted as permitted by clearances 82 until the proper alignment of axle 38 has been restored. Then nut 66 is tightened and plates 58 are again welded to frame bracket 22, and the realignment procedure is complete. If, during this procedure, it is necessary to replace plates 58, bolt 64 is merely removed, the old plates discarded, and the parts reassembled with new plates 58 in place.

A factor which contributes materially to convenience in forming and burning off welds 80 is that side portions 68 of plates 58 are always retained in a generally vertical orientation. Thus, the welds each comprise simply a generally straight vertical line. There are no corners or curved surfaces to weld around, and the principal load on the weld is in the direction of its greatest dimension.

It will be apparent that plates 58 may be regarded as enlargements on bolt 64, one of which would be integral with the bolt provided that provision is made for relative axial movement of the enlargement to facilitate tightening of connection 20.

Figures 5, 6, 7, 8, 9:
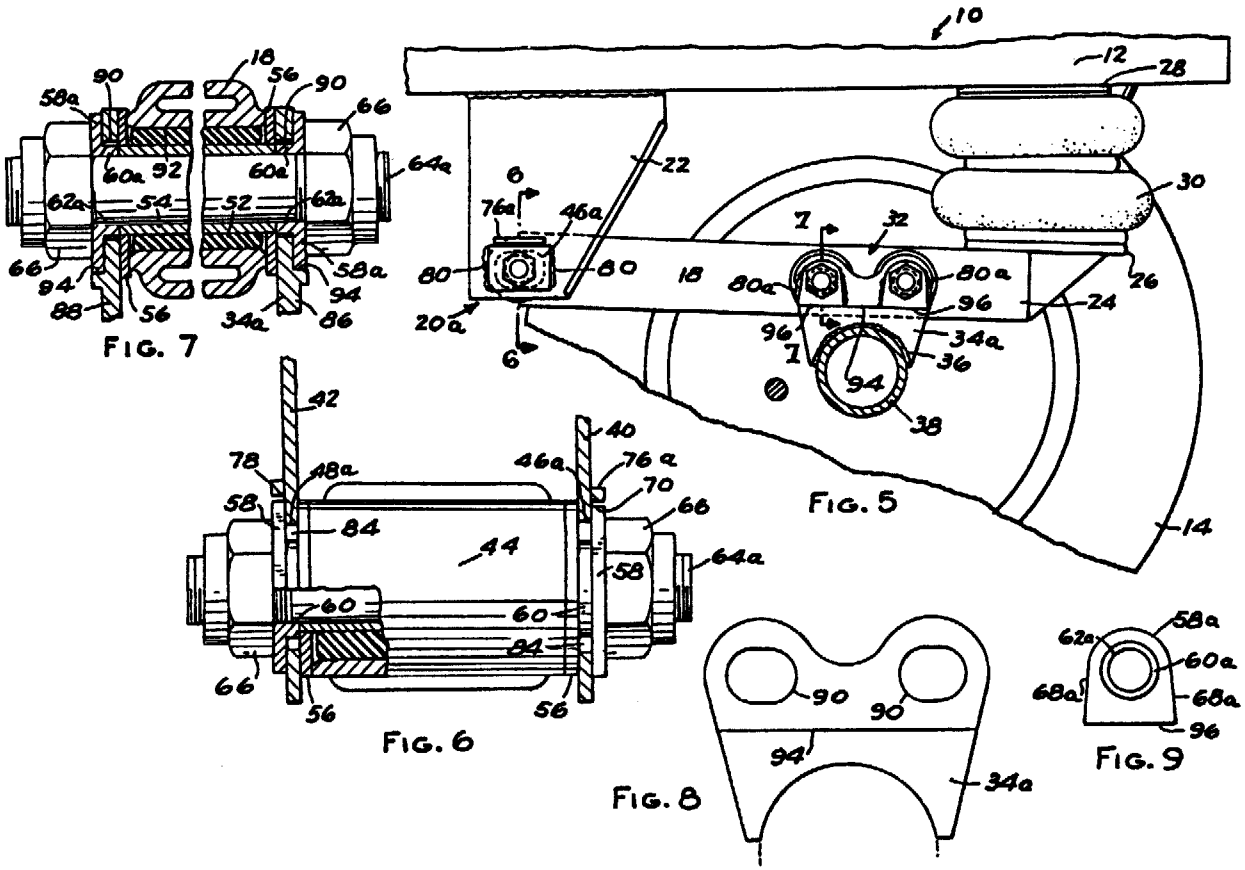
FIG. 5 is a view generally similar to FIG. 1 but showing a modified form of the invention.
FIG. 6 is an enlarged sectional view on line 6—6 of FIG. 5 with parts broken away to illustrate structural details.
FIG. 7 is an enlarged sectional view on line 7—7 of FIG. 5.
FIG. 8 is an enlarged side elevational view of an axle attachment bracket.
FIG. 9 is an enlarged side elevational view of a weld plate used in conjunction with the bracket of FIG. 8.

The form of the invention illustrated in FIGS. 5–9 is, in general, similar to that described above except that pivotal connection 20a is constructed and arranged to facilitate vertical alignment as well as horizontal alignment of axle 38 with respect to frame 12. In this modification, openings 46a, 48a are not only elongate in a horizontal direction but are also oversize in a vertical direction with respect to bosses 60 as shown at 84 (FIG. 6). With this construction, end portion 44 of control arm 18 can be shifted vertically relative to frame bracket 22 to accomplish vertical alignment of axle 38 with respect to the frame. When both the horizontal and vertical alignment have been completed, nut 66 is tightened and plates 58 welded to bracket 12, as described above.

In this modification, bolt 64a is shown as being headless and threaded at both ends, head 72 being replaced by a second nut 66. With this arrangement, pivotal connection 20a between the control arm and bracket 22 can be assembled and disassembled from either side of bracket 22. Lug 76a projecting from bracket side 40 may be shortened, since it must extend outwardly only far enough to engage top edge 70 of plate 58.

Modified axle bracket 34a has laterally spaced sides 86, 88 which embrace control arm 18. These sides are provided with two aligned pairs of openings 90 which are elongate horizontally in a direction longitudinal of control arm 18. Control arm 18 has a pair of openings 92, each of which is aligned between a pair of openings 90 in the axle bracket. Within each opening 92 is press fitted a rubber bushing 52 bonded to an inner metal sleeve 54. The control arm and axle bracket are interconnected by an assembly analagous to pivotal connection 20 or 20a which includes a bolt 64a and nuts 66 which secure weld plates 58a, washers 56, and sleeve 54 tightly together variously in metal-to-metal contact. Plate 58a has a boss 60a and central opening 62a as shown. Bracket 34a has at each side an outwardly projecting shoulder 94 positioned to engage a flat 96 on weld plate 58a. This retains side edge portions 68a of the weld plates in a generally vertical orientation when one or more of nuts 66 on bolt 64a are tightened.

The assembly and alignment procedure with respect to connection 32a is generally similar to that described above with respect to pivotal connections 20, 20a. The various elements are first assembled with nuts 66 in loosened condition. Axle 38 is then shifted horizontally relative to control arm 18 and weld plates 58a and bolts 64a shift with axle bracket 34a. One or more of the nuts 66 is then tightened to initially secure the parts in aligned relation of axle 38 with respect to frame 12. Then side edge portions 68a of the weld plates are welded to bracket 34a as at 80a. In any subsequent realignment of axle 38 which becomes necessary, the procedure discussed above with respect to pivotal connection 20 is followed.

It is contemplated that in most suspensions utilizing the present invention, adjustable pivotal connections 20 or 20a will be provided between the control arms 18 and frame brackets 22 at each side of the vehicle while the connections between the axle and control arms are left non-adjustable, as is connection 32 (FIG. 1). In most vehicles, these two adjustable connections will provide all of the adjustment leeway required. In some vehicles, less adjustment leeway may be necessary; and if so, a connection 20 or 20a will be provided only between one control arm and one frame bracket 22, the other control arm and frame bracket being left non-adjustable. On the other hand, if an extraordinary extent of adjustment is required, both the axle connections 32a and the frame connections 20 or 20a or any combination of these may be made adjustable. In this regard, it will be obvious that axle connections 32a by appropriate vertical enlargement of openings 90 can be made vertically adjustable as well as horizontally adjustable.

I claim:

1. In a vehicle having a frame with ground-engaging wheels suspended therefrom by two arms having pivotal connections to opposite sides of the frame for substantially coaxial swinging in a vertical direction, wheel-carrying axle means having connections with said arms, and spring means in load-transmitting relation between said frame and arms, improved structure wherein at least one of said connections includes a member having an apertured portion, said arm having an apertured portion, the apertures of said portions being aligned, pin means extending through said apertures and thereby securing said arm and member together, at least one of said apertures having a cross dimension greater than that of said pin means therein so that said arm and member can be freely shifted relative to each other for aligning said axle means relative to said frame, means effective to tighten said pin means relative to said arm and frame and thereby initially secure said axle means and frame in their relatively aligned position, enlarged means movably disposed on and in bearing engagement with said pin means, said enlarged means engaging said member in tightened condition of said pin means,

*said enlarged means having an edge portion, and means on said member positioned to engage said edge portion to maintain the predetermined alignment to said enlarged means with respect to said member,* and a welded connection between said enlarged means and member effective to fix the relative alignment of said axle means and frame.

2. The combination defined in claim 1 wherein said pin means and enlarged means are relatively detachable from each other to facilitate disassembly and then reassembly of said arm and member with said axle means and frame in said fixed relative alignment.

3. The combination defined in claim 2 wherein said enlarged means comprises an element having an opening through which said pin means removably extends.

4. The combination defined in claim 1 wherein said enlarged means has opposite side edge portions which extend in a generally vertical direction, said welded connection being between said side edge portions and said member.

5. [The combination defined in claim 1 wherein] *In a vehicle having a frame with ground-engaging wheels suspended therefrom by two arms having pivotal connections to opposite sides of the frame for substantially coaxial swinging in a vertical direction, wheel-carrying axle means having connections with said arms, and spring means in load-transmitting relation between said frame and arms, improved structure wherein*

*at least one of said connections includes a member having an apertured portion, said arm having an apertured portion, the apertures of said portions being aligned,*

*pin means extending through said apertures and thereby securing said arm and member together,*

*at least one of said apertures having a cross dimension greater than that of said pin means therein so that said arm and member can be freely shifted relative to each other for aligning said axle means relative to said frame,*

*means effective to tighten said pin means relative to said arm and frame and thereby initially secure said axle means and frame in their relatively aligned position,*

*enlarged means movably disposed on and in bearing engagement with said pin means, said enlarged means engaging said member in tightened condition of said pin means,* said enlarged means [comprises] *comprising* an element having an opening, and said pin means comprises a bolt which extends through said opening, said tightening means comprising nut means on said bolt, said element having opposite side edge portions and another portion, means on said member positioned to engage said other portion and thereby secure said side edge portions of said element in a generally vertical direction, [said welded connection being between said side edge portions and said member] *and*

*a welded connection between said enlarged means at said side edge portions and said member effective to fix the relative alignment of said axle means and frame.*

6. The combination defined in claim 5 wherein said other portion comprises a generally horizontally extending portion, and said means on said member comprises a generally horizontal shoulder which projects adjacent thereto.

7. The combination defined in claim 5 wherein said bolt has a head with a flat, said means on said member also being positioned to engage said flat and secure said bolt against rotation upon turning of said nut means.

8. The combination defined in claim 1 wherein said pin means comprises a headless bolt, both ends of which are threaded and extend away from said member and arm, said tightening means including a nut on each end of said bolt.

9. The combination defined in claim 1 wherein said enlarged means comprises an element having an opening through which said pin means extends, said element having a boss around said pin means which extends axially into said one aperture, said aperture having a cross dimension greater than that of said boss.

10. The combination defined in claim 1 wherein said pin means extends generally horizontally in a direction transverse to said arm, said greater cross dimension being in a generally horizontal direction longitudinal of said arm.

11. The combination defined in claim 1 wherein said pin means extends generally horizontally in a direction transverse to said arm, said one aperture having a cross dimension greater than that of said pin means, both in a vertical direction and in a horizontal direction longitudinal of said arm.

12. The combination defined in claim 1 wherein said member comprises a bracket having laterally spaced sides with aligned apertures therein and defining said apertured portion thereof, said apertured portion of said arm being disposed between said bracket apertures, said enlarged means comprising two enlargements, each of which engages an outer face of one of said sides.

13. The combination defined in claim 12 wherein said pin means comprises a bolt and said tightening means comprises a nut thereon, means forming a head on said bolt, said bracket sides, apertured portions, and enlargements being contained between said head and nut, at least one of said enlargements being axially movable on said bolt to facilitate said tightening.

14. The combination defined in claim 13 wherein each of said enlargements comprises a plate with an opening through which said bolt slidably extends, said plates having generally vertical side edge portions, said welded connection being between said side edge portions of said plate and said outer faces of said bracket sides.

15. The combination defined in claim 14 wherein each of said plates has another portion, said bracket sides having shoulders which project outwardly of said outer faces adjacent said other portions and provide obstructions to turning of said plates when said nut is tightened and thereby secure said side edge portions in their generally vertical orientation.

16. The combination defined in claim 12 wherein said pin means comprises a threaded element and said tightening means comprises a nut threaded on each end of said element, said bracket sides apertured portions, and enlargements being axially movable on said element to facilitate said tightening.

17. The combination defined in claim 12 wherein said bracket is mounted on said frame, said pin means providing a member of said pivotal connection.

18. The combination defined in claim 17 wherein each of said arms has a said pivotal connection to said frame.

19. The combination defined in claim 12 wherein said bracket is mounted on said axle means.

20. The combination defined in claim 19 wherein each of said bracket sides is provided with two of said apertures spaced longitudinally of said arm, and said arm having two apertures, each of which is aligned between apertures in said sides, said pin means comprising two pins, each of which projects through a group of the aligned apertures.

*21. In a vehicle having a frame with ground-engaging wheels suspended therefrom by two arms having pivotal connections to opposite sides of the frame for substantially coaxial swinging in a vertical direction, wheel-carrying axle means having connections with said arms, and spring means in load-transmitting relation between said frame and arms, improved structure wherein*

*at least one of said connections includes a member having an apertured portion, said arm having an apertured portion, the apertures of said portions being aligned,*

*pin means extending through said apertures and thereby securing said arm and member together,*

*at least one of said apertures having a cross dimension greater than that of said pin means therein so that said arm and member can be freely shifted relative to each other for aligning said axle means relative to said frame,*

*means effective to tighten said pin means relative to said arm and frame and thereby initially secure said axle means and frame in their relatively aligned position,*

*enlarged means movably disposed on and in bearing engagement with said pin means, said enlarged means engaging said member in tightened condition of said pin means,*

*said enlarged means comprising an element having an opening through which said pin means extends, said element having a boss around said pin means which extends axially into said one aperture, said aperture having a cross dimension greater than that of said boss, and*

*a welded connection between said enlarged means and member effective to fix the relative alignment of said axle means and frame.*

*22. In a vehicle having a frame with ground-engaging wheels suspended therefrom by two arms having pivotal connections to opposite sides of the frame for substantially coaxial swinging in a vertical direction, wheel-carrying axle means having connections with said arms, and spring means in load-transmitting relation between said frame and arms, improved structure wherein*

*at least one of said connections includes a member having an apertured portion, said arm having an apertured portion, the apertures of said portions being aligned;*

*pin means extending through said apertures and thereby securing said arm and member together;*

*at least one of said apertures having a cross dimension greater than that of said pin means therein so that said arm and member can be freely shifted relative to each other for aligning said axle means relative to said frame;*

*means effective to tighten said pin means relative to said arm and frame and thereby initially secure said axle means and frame in their relatively aligned position;*

*enlarged means movably disposed on and in bearing engagement with said pin means, said enlarged means engaging said member in tightened condition of said pin means;*

*said pin means extends generally horizontally in a direction transverse to said arm, said one aperture having a cross dimension greater than that of said pin means, both in a vertical direction and in a horizontal direction longitudinal of said arm; and*

*a welded connection between said enlarged means and member effective to fix the relative alignment of said axle means and frame.*

*23. In a vehicle having a frame with ground-engaging wheels suspended therefrom by two arms having pivotal connections to opposite sides of the frame for substantially coaxial swinging in a vertical direction, wheel-carrying axle means having connections with said arms, and spring means in load-transmitting relation between said frame and arms, improved structure wherein*

*at least one of said connections includes a member having an apertured portion, said arm having an apertured portion, the apertures of said portions being aligned,*

*pin means extending through said apertures and thereby securing said arm and member together,*

*at least one of said apertures having a cross dimension greater than that of said pin means therein so that said arm and member can be freely shifted relative to each other for aligning said axle means relative to said frame,*

*means effective to tighten said pin means relative to said arm and frame and thereby initially secure said axle means and frame in their relatively aligned position,*

*enlarged means movably disposed on and in bearing engagement with said pin means, said enlarged means engaging said member in tightened condition of said pin means,*

*a welded connection between said enlarged means and member effective to fix the relative alignment of said axle means and frame,*

*a bracket having laterally spaced sides with aligned apertures therein and defining said apertured portion thereof, said apertured portion of said arm being disposed between said bracket apertures, said enlarged means comprising two enlargements, each of which engages an outer face of one of said sides,*

*the pin means comprises a bolt and said tightening means comprises a nut thereon, means forming a head on the bolt, the bracket sides, apertured portions, and enlargements being contained between the head and nut, at least one of the enlargements being axially movable on the bolt to facilitate said tightening, and*

*a welded connection between said enlarged means and member effective to fix the relative alignment of said axle means and frame.*

* * * * *